H. D. SEVERANCE.
FISH CUTTING AND CLEANING MACHINE.
APPLICATION FILED JUNE 15, 1921.
1,400,186. Patented Dec. 13, 1921.
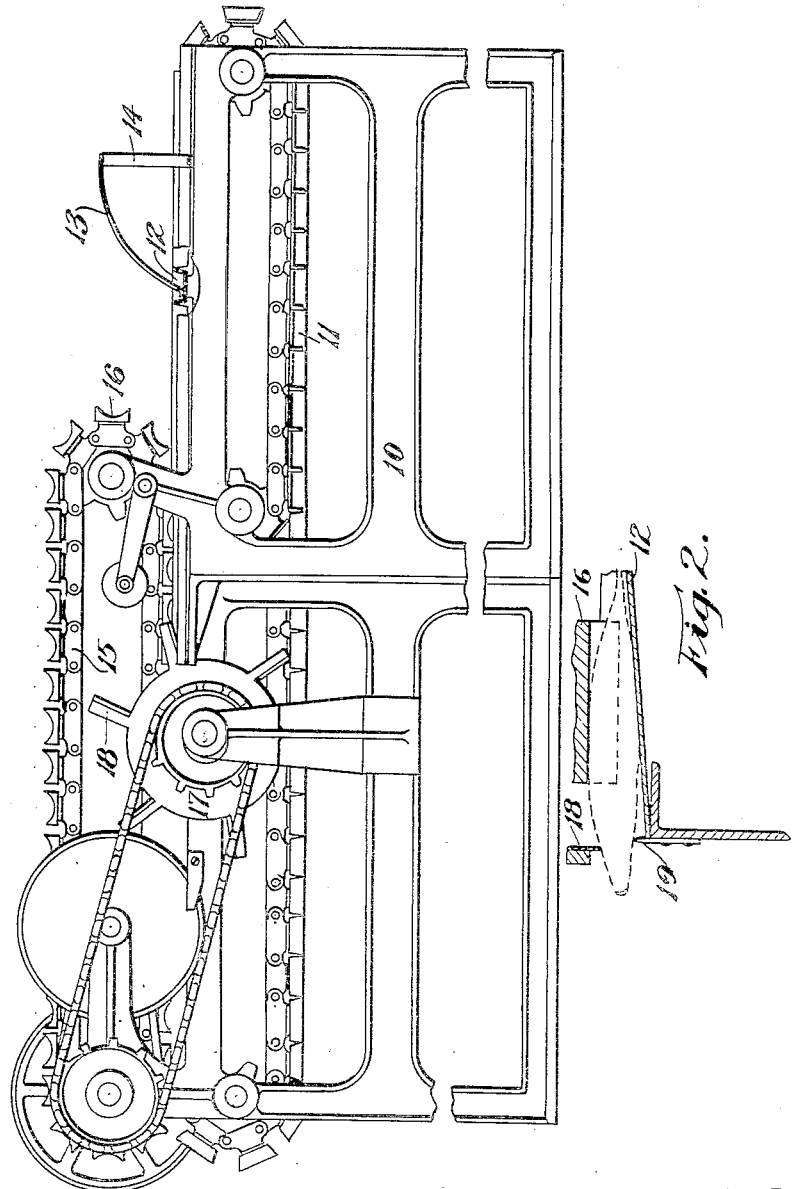
INVENTOR
HOWARD DANIEL SEVERANCE
ATTY.

UNITED STATES PATENT OFFICE.

HOWARD DANIEL SEVERANCE, OF MONTEREY, CALIFORNIA.

FISH CUTTING AND CLEANING MACHINE.

1,400,186.   Specification of Letters Patent.   Patented Dec. 13, 1921.

Application filed June 15, 1921. Serial No. 477,624.

*To all whom it may concern:*

Be it known that I, HOWARD DANIEL SEVERANCE, a citizen of the United States, residing at Monterey, in the county of Monterey and State of California, have invented new and useful Improvements in Fish Cutting and Cleaning Machines, of which the following is a specification.

This invention relates to fish cutting and cleaning machines of the type shown and described in my prior application, Serial No. 433,117, filed December 27th, 1920. The object of this invention is to improve the operation of a machine of the type above mentioned. This object I accomplish by the provision of means for arranging the fish on their sides within the pockets and means to penetrate the side of each fish near its head to hold it against longitudinal displacement when the severing device strikes the head.

One form which my invention may assume is exemplified in the following description and illustrated in the accompanying drawings, in which—

Figure 1 shows a side elevation of a machine to which my improvements have been applied.

Fig. 2 shows a detailed sectional view of the device for assisting in retaining the fish within the pocket.

In the present form of the invention, I use a main frame 10 provided with an endless conveyer 11, said conveyer being fitted with a series of pockets 12. Fish are fed into these pockets—heads projecting outwardly—from a feeding device not shown. I arrange a spring 13 upon a standard 14, in position to coöperate with the fish in the pockets so that the latter in passing beneath the spring will be turned upon their sides before reaching the severing device. Overlying the conveyer 11 is an endless belt or chain 15 fitted with shoes 16 to coöperate with the pockets and clamp the fish between with the heads projecting. A rotary disk is journaled alongside of the frame and has a series of radial arms or blades 18 to strike the projecting heads of the fish and remove the same, causing the entrails to be withdrawn at the same time.

The severing arms or blades are not especially sharp, and when striking the head, there is danger of dislodging the fish from the pocket notwithstanding the degree of pressure applied by the clamping means. Therefore, I arrange a sharpened projection or lug 19 on the side of the frame in the region occupied by the fish when the severing device comes into play. This blade or lug projects above the bottom of the pocket at the outer end thereof, as best shown in Fig. 2.

In the operation of the device, the fish will be caused to ride upon the projecting lug or blade 19 and when the downwardly moving severing arm 18 strikes the head of the fish, this lug or blade 19 will penetrate the fish at the underside and prevent movement of the body outwardly. Since the fish is lying on its side, there is no danger of the projection 19 severing the gut and therefore the latter will be withdrawn with the head.

Having thus described my invention, what I claim and desire to secure by Letters Patent is:—

1. In a machine of the class described, a conveyer provided with pockets, each to receive a fish with the heads projecting therefrom, an overhead device to clamp the fish in place within the pockets, a severing device to deliver a downward blow to the projecting heads of the fish for the purpose of removing the same and a device beneath the projecting head to penetrate the fish slightly for the purpose of preventing displacement when the severing device strikes the head.

2. In a machine of the class described, a main frame, an endless conveyer thereon provided with pockets each to receive a fish with the heads projecting therefrom, an overhead conveyer fitted with shoes to coöperate with the pockets and clamp the fish in place therein, a rotary severing device having blades or arms to strike the projecting heads of the fish for the purpose of removing the same, and a blade carried by the main frame and projecting above the bottom of the pockets at the outer end thereof and arranged in juxtaposition with the severing device, whereby when the latter strikes the projecting head, the blade beneath will penetrate the fish and prevent dislodgment thereof from the pocket.

3. The combination set forth in claim 1 including means in advance of the severing device to arrange the fish upon their sides in said pockets.

4. In a machine of the class described, an endless conveyer provided with pockets, each to receive a fish with heads projecting therefrom, an overhead device to clamp the fish in place in the pockets, a severing device to remove the projecting heads of the fish and means located in advance of the severing device to arrange the fish upon their sides in said pockets, said means comprising a spring member, contacting with a portion of the pocket.

HOWARD DANIEL SEVERANCE.